H. J. LYMAN.
Butter Washer, Cooler and Worker.
No. 223,934. Patented Jan. 27, 1880.
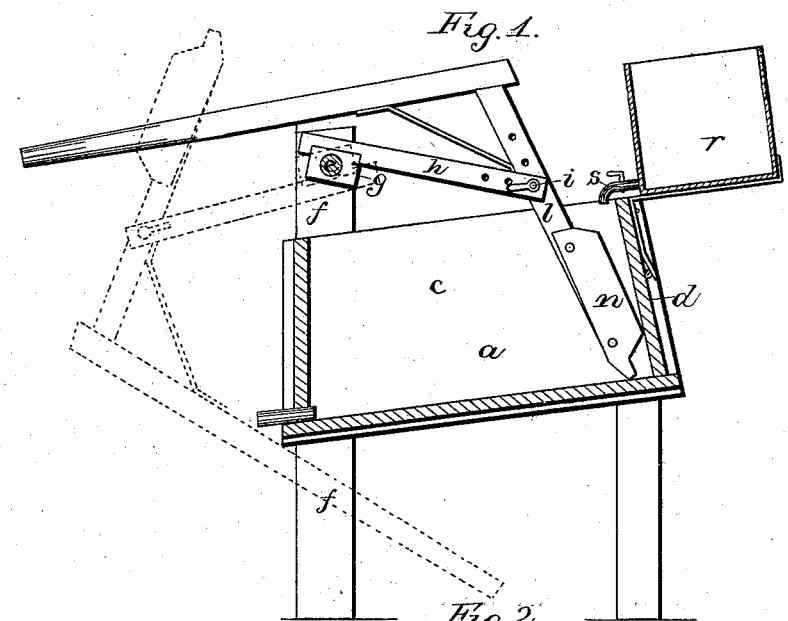
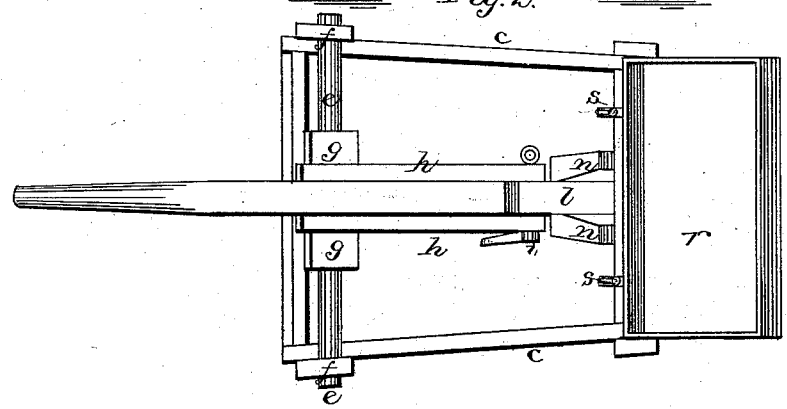
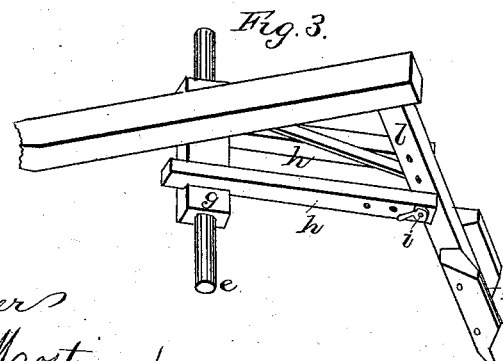
Witnesses:
J. W. Garner
Wm. W. Mortimer
Inventor:
H. J. Lyman,
per
F. A. Lehmann,
Atty.

UNITED STATES PATENT OFFICE.

HENRY J. LYMAN, OF SPARTANSBURG, PENNSYLVANIA.

BUTTER WASHER, COOLER, AND WORKER.

SPECIFICATION forming part of Letters Patent No. 223,934, dated January 27, 1880.

Application filed October 16, 1879.

*To all whom it may concern:*

Be it known that I, HENRY J. LYMAN, of Spartansburg, in the county of Crawford and State of Pennsylvania, have invented certain new and useful Improvements in Combined Butter Washer, Cooler, and Worker; and I do hereby declare the following to be a full, clear, and exact description of the invention, such as will enable others skilled in the art to which it pertains to make and use it, reference being had to the accompanying drawings, which form part of this specification.

My invention relates to an improved butter worker, washer, and cooler combined; and it consists in the arrangement and combination of parts whereby the operating-lever is moved from side to side and adjusted in regard to the end of the box, as will be more fully described hereinafter.

Figure 1 is a vertical longitudinal section of my invention. Fig. 2 is a plan view of the same, and Fig. 3 is a perspective of the lever and its supports.

*a* represents the box in which the butter is placed to be worked, washed, and cooled, and which has its bottom made sloping, so as to be higher at one end than the other, and thus cause the water to flow rapidly off. The end of the box upon which the water-tank *b* is placed is inclined inward at such an angle as to cause the sheet of butter, as often as it is pressed against the end of the box, to fall over back into the box as soon as the lever is moved backward, and thus the butter is constantly changing its position and presenting itself to the lever in a new form. The two sides *c* of the box diverge outward from this inclined end *d*, so that the sides will form no help to keep the butter from falling over, either at the corners or any other place. As the two sides *c* diverge from the end *d*, the lower end of the box is made the widest.

The upper ends of the legs *f*, which support the lower end of the box, project a suitable distance above the top edge of the box, and have the pivotal bar or rod *e* secured rigidly between them. Upon this bar or rod is placed the sliding block *g*, which not only moves freely back and forth upon the bar, but turns about one-half around, thereby enabling the working-lever to be moved from one side of the box to the other, or lifted entirely out of the box while the butter is being placed in or taken out of the box. Extending from this sliding block are the two parallel supporting-arms *h*, which have a series of holes made through their free ends, and through one of these holes and through the pivotal bolt *i*, upon which the lever works. This lever is made L-shaped, the longest arm of which projects backward beyond the lower end of the box for the operator to take hold of, while the shorter arm projects down into the box and forms a paddle, *n*, for working the butter. Through this short arm are also made a series of holes, so that by changing the pivot-bolt *i* from one to the other the operator is given more or less leverage, as may be required to work the butter to the best advantage.

When the pivot is placed in the lower hole in the lever, so as to give the operator the greatest leverage, the pivot should also be passed through the last holes at the ends of the two arms *h*, so that the paddle will easily reach the inclined end of the box.

When there is a considerable quantity of butter to be worked, and it is necessary that the end of the paddle should reach down to the lower end of the box, the pivot is changed to the highest hole in the lever and the holes in the arms that are nearest to the sliding block.

The paddle *n* is provided with a flange on both of its sides, so as to hold the butter against the end of the box, and thus enable a certain amount of pressure to be brought to bear upon it for the purpose of squeezing out the milk or water. The face of this paddle, while pressing the butter against the end of the box, is inclined backward at a greater angle than the end of the box, so that each portion of the butter that is pressed by the paddle is made heaviest at its top or upper portion, so that when the paddle is moved backward from the butter that portion just pressed falls upon the bottom of the box, ready to be pressed in another form. As the butter thus presents a new form to the paddle each time, the butter can be constantly worked without having to stir it up or move it by the hand, and hence can be worked more rapidly and effectively than in any other manner.

Removably fastened to the upper end of the box is the cold-water reservoir $r$, by means of any suitable devices, and which reservoir is provided with any suitable number of cocks $s$, so as to let the water run upon the butter while being worked. As the water can be kept constantly pouring over the butter, it will greatly aid in the washing and working of the butter and in cooling the butter off to any desired temperature after it has been worked.

Although the devices described are here shown in one form, yet I do not limit myself to this form alone, as these devices may be somewhat varied without departing from the spirit of my invention.

Having thus described my invention, I claim—

The combination of the pivotal bar $e$, sliding block $g$, placed thereon, arms $h$, and lever $l$, the arms and lever being provided with a series of holes, substantially as set forth.

In testimony that I claim the foregoing I have hereunto set my hand this 2d day of October, 1879.

HENRY J. LYMAN.

Witnesses:
M. W. MOFFITT,
JAS. L. WEST.